United States Patent
Miller et al.

(10) Patent No.: US 9,623,866 B2
(45) Date of Patent: Apr. 18, 2017

(54) METHODS AND SYSTEMS FOR SELECTIVELY ADAPTING ENGINE AIR FLOW

(71) Applicant: Ford Global Technologies, LLC, Dearborn, MI (US)

(72) Inventors: Kenneth James Miller, Canton, MI (US); Douglas Raymond Martin, Canton, MI (US); Bruce Colby Anderson, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 31 days.

(21) Appl. No.: 14/713,907

(22) Filed: May 15, 2015

(65) Prior Publication Data

US 2016/0332617 A1  Nov. 17, 2016

(51) Int. Cl.
*B60W 20/15* (2016.01)
*B60W 10/06* (2006.01)
*F02D 41/14* (2006.01)

(52) U.S. Cl.
CPC ............ *B60W 20/15* (2016.01); *B60W 10/06* (2013.01); *F02D 41/1454* (2013.01); *B60W 2510/06* (2013.01); *B60W 2710/0666* (2013.01); *Y10S 903/902* (2013.01)

(58) Field of Classification Search
CPC .... B60W 20/15; B60W 10/06; F02D 41/1454
See application file for complete search history.

(56) References Cited

U.S. PATENT DOCUMENTS

| | | | | |
|---|---|---|---|---|
| 5,001,643 | A | * 3/1991 | Domino | F02D 41/18 123/674 |
| 5,467,750 | A | * 11/1995 | Braun | F02D 41/1497 123/350 |
| 6,119,063 | A | 9/2000 | Hieb et al. | |
| 6,246,951 | B1 | * 6/2001 | Robichaux | F02D 11/105 701/110 |
| 6,349,700 | B1 | * 2/2002 | Buckland | B60K 31/04 123/339.19 |
| 6,490,511 | B1 | 12/2002 | Raftari et al. | |
| 6,619,267 | B1 | * 9/2003 | Pao | F02B 75/22 123/184.25 |
| 6,761,146 | B1 | * 7/2004 | Livshiz | F02D 11/105 123/361 |
| 7,275,518 | B1 | * 10/2007 | Gartner | F02D 41/0002 123/406.23 |
| 7,813,865 | B2 | 10/2010 | Martin | |
| 7,967,720 | B2 | * 6/2011 | Martin | B60K 6/365 123/520 |
| 8,439,012 | B2 | 5/2013 | Martin et al. | |
| 8,725,304 | B2 | * 5/2014 | Tani | F02D 41/1401 290/44 |
| 2007/0125083 | A1 | * 6/2007 | Rollinger | B60K 6/48 60/605.1 |

(Continued)

*Primary Examiner* — Calvin Cheung
(74) *Attorney, Agent, or Firm* — David Kelley; McCoy Russell LLP

(57) ABSTRACT

Systems and methods for adjusting an engine air flow transfer function and engine actuators based on the engine air flow transfer function are presented. The system and method may be applied to hybrid powertrains having a capability to estimate engine torque based on operating characteristics of a motor during vehicle operation.

20 Claims, 5 Drawing Sheets

(56) References Cited

U.S. PATENT DOCUMENTS

| | | | |
|---|---|---|---|
| 2011/0213547 A1* | 9/2011 | Reed | F02D 41/0235 |
| | | | 701/109 |
| 2012/0035793 A1* | 2/2012 | Kang | B60W 10/06 |
| | | | 701/22 |
| 2012/0138016 A1* | 6/2012 | Martin | F02D 37/02 |
| | | | 123/406.23 |
| 2013/0296123 A1* | 11/2013 | Doering | B60W 10/02 |
| | | | 477/5 |
| 2015/0134227 A1* | 5/2015 | Yu | F02D 28/00 |
| | | | 701/102 |
| 2015/0285160 A1* | 10/2015 | Zhang | F02M 35/10229 |
| | | | 60/602 |
| 2016/0169089 A1* | 6/2016 | Xiao | F02D 41/0007 |
| | | | 701/103 |
| 2016/0214596 A1* | 7/2016 | Glugla | B60W 20/00 |

\* cited by examiner

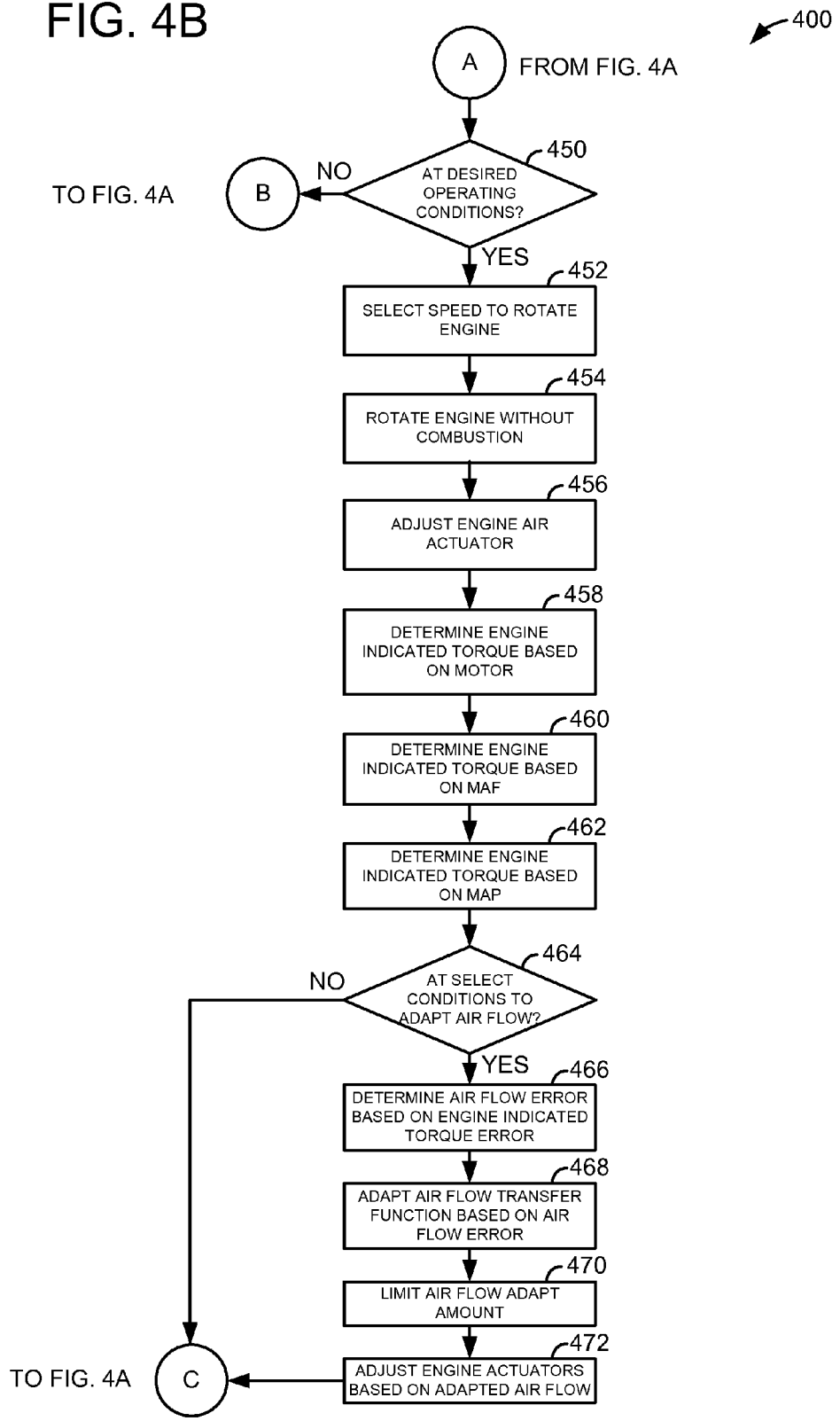

METHODS AND SYSTEMS FOR SELECTIVELY ADAPTING ENGINE AIR FLOW

FIELD

The present description relates to a system and method for adjusting an engine air flow transfer function and engine actuators responsive to the engine air flow transfer function. The methods and systems may be useful for a variety of hybrid drivelines including series and parallel configurations.

BACKGROUND AND SUMMARY

An engine's air-fuel ratio may be controlled to reduce engine emissions. During some conditions, the engine's air-fuel ratio may deviate from a desired air-fuel ratio due to manufacturing variation or degradation of engine components. One source of engine air-fuel ratio error may be fuel injectors not delivering a desired or expected amount of fuel. Another source of engine air-fuel error may be an inaccurate engine air flow estimate based on an engine air flow sensor. An aggregate air-fuel ratio error may be determined via an oxygen sensor position in the engine's exhaust system, but the aggregate error provides little insight into whether the air-fuel error is a result of fueling or the engine air flow estimate. The engine air-fuel ratio error may be corrected via injecting more or less fuel to the engine. However, if the engine air-fuel error was actually a result of an engine air flow estimate, adjustments to engine air flow related actuators and determination of engine air flow related control parameters, such as engine torque, may be improper. Therefore, it may be desirable to provide separate and accurate estimates of engine air flow and fuel flow.

The inventors herein have recognized the above-mentioned disadvantages and have developed a method, comprising: receiving vehicle information from one or more sensors to a controller; adjusting a value of a first transfer function responsive to motor/generator operating conditions and an output of a second transfer function, the first transfer function a first basis for determining engine air flow, the second transfer function a second basis for determining engine air flow; and adjusting a torque actuator of an engine responsive to the adjusted value.

By updating a first engine air flow related transfer function responsive to motor/generator conditions and a second engine air flow related transfer function, it may be possible to improve engine air flow estimates without having to rely on estimated exhaust gas concentrations. Further, by not using an oxygen sensor to estimate engine air flow it may be possible to reduce a number of variables that may influence engine air flow determination. For example, it may be possible to estimate engine air flow when an engine is rotating but not combusting air and fuel. Consequently, parameters that may influence air flow through the engine, such as fuel properties and spark timing, may be eliminated from engine air flow estimates so that engine air flow variability may be reduced.

The present description may provide several advantages. Specifically, the approach may improve vehicle efficiency over a vehicle's life cycle. Further, the approach may reduce engine air-fuel mixture variation. Further still, the approach may improve engine torque control by improving engine torque estimates.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 4A and 4B show an example method for revising desired engine and motor/generator operating conditions.

DETAILED DESCRIPTION

Figure 1:
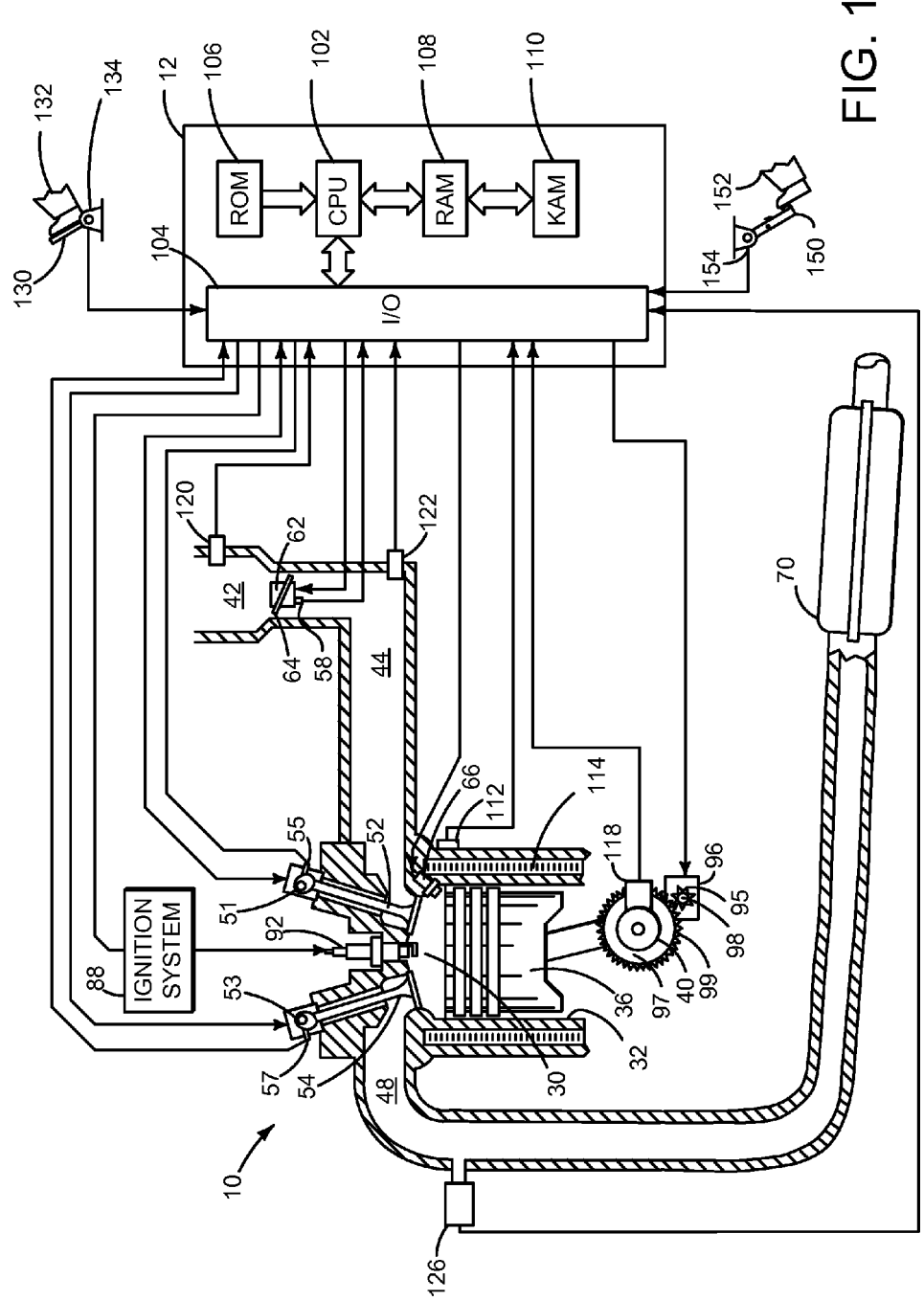
FIG. 1 is a schematic diagram of an engine.
Figure 2:
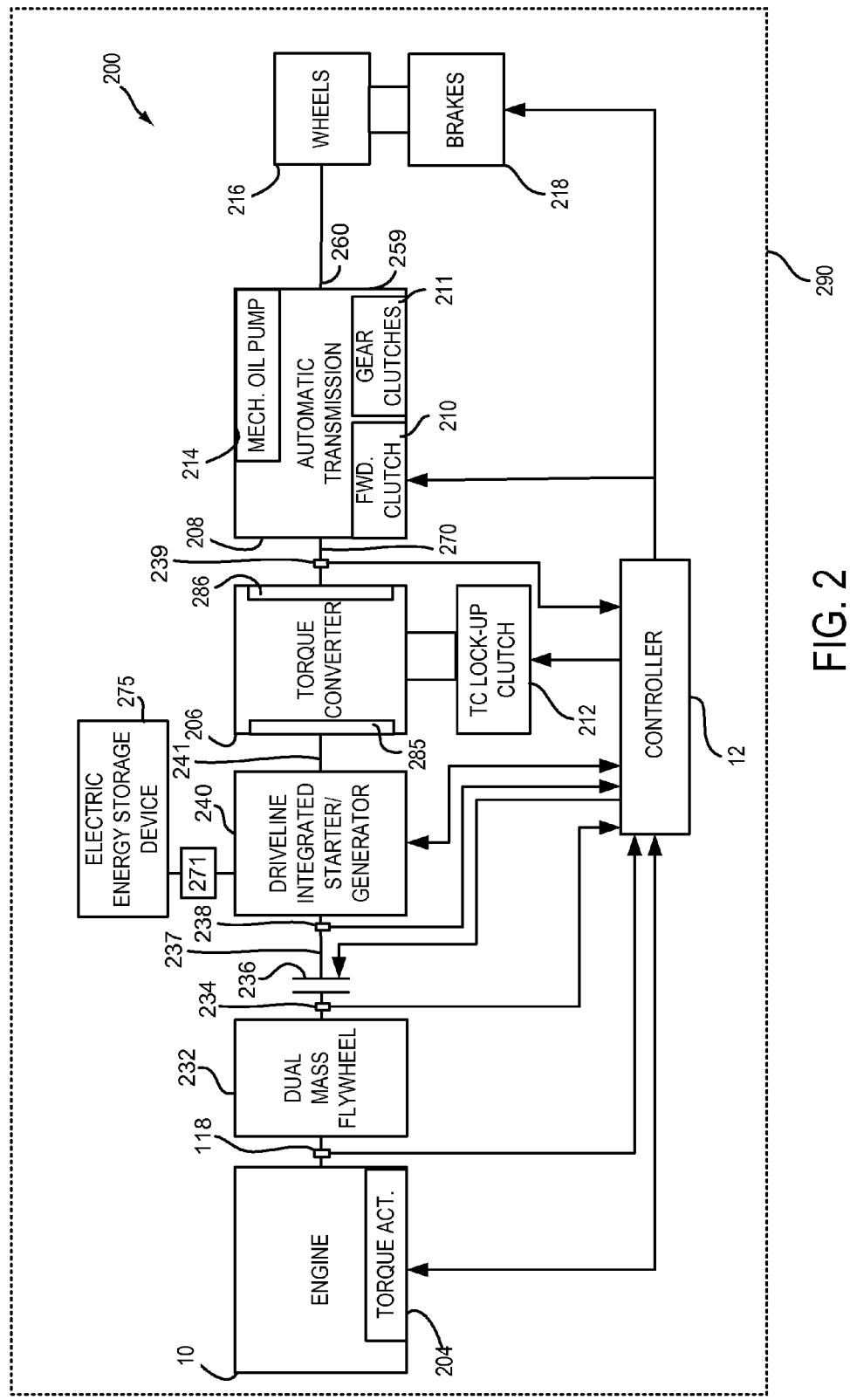
FIG. 2 shows a first example vehicle driveline configuration.
Figure 3:
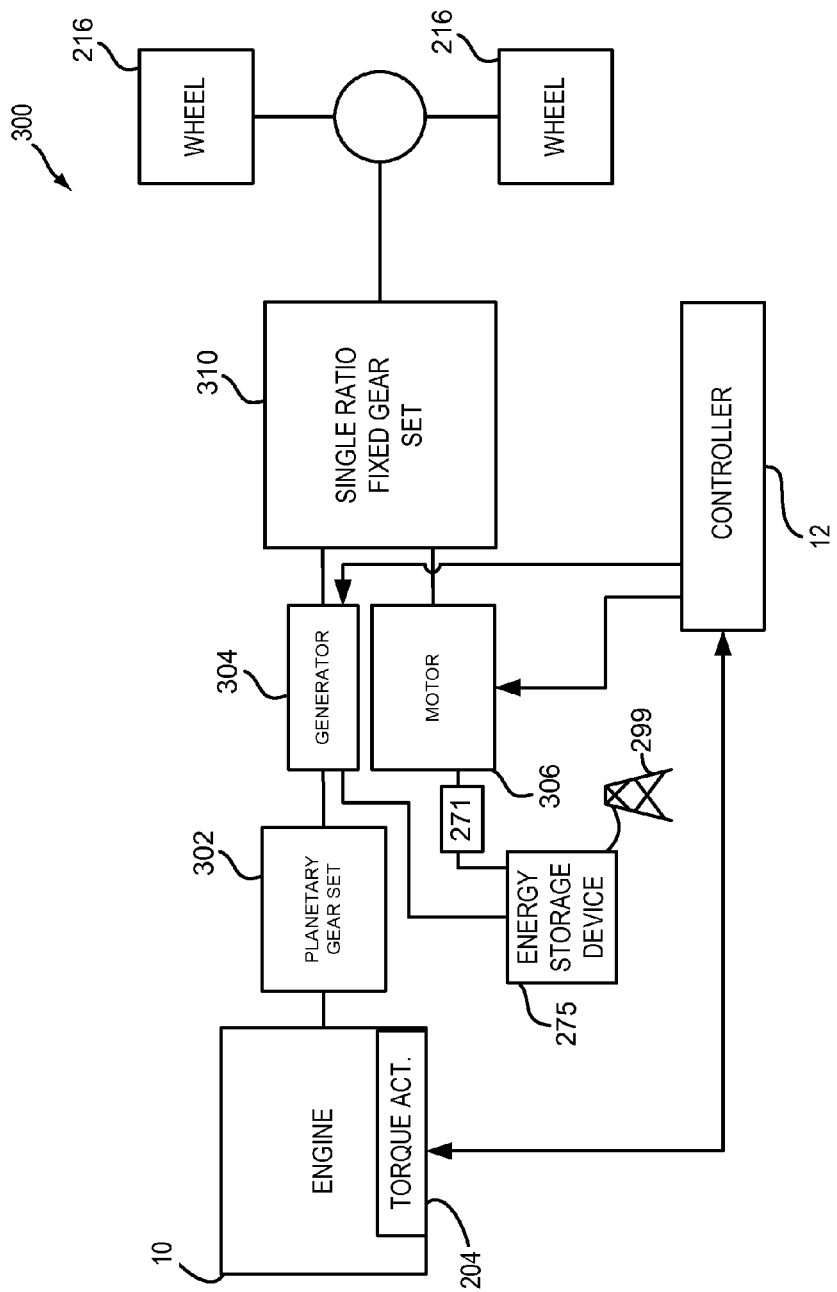
FIG. 3 shows a second example vehicle driveline configuration.
Figure 4A:
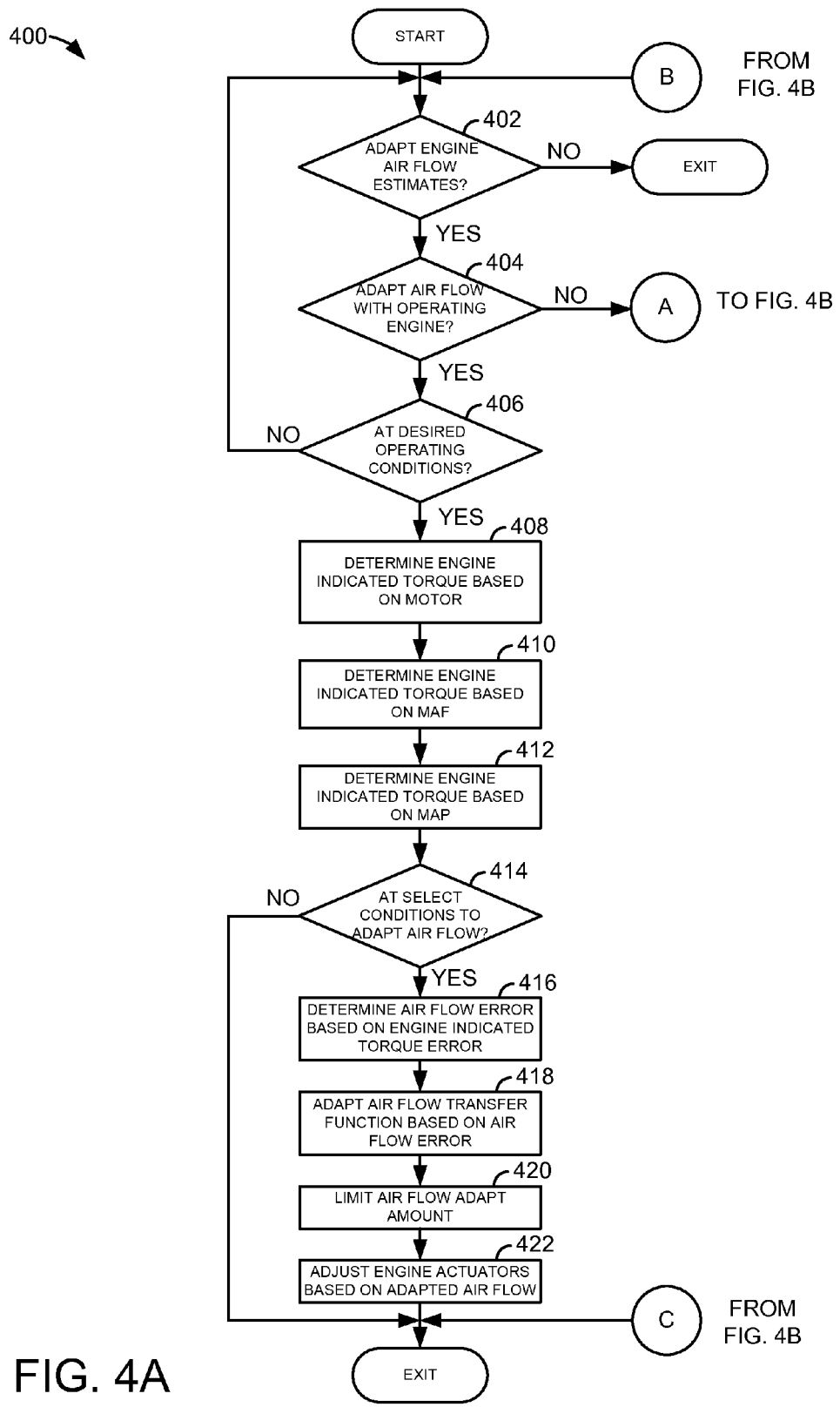

The present description is related to revising one or more transfer functions describing engine air flow and making adjustments to engine actuators based on the revised transfer functions. The transfer functions may be revised based at least on operation of a motor/generator of a hybrid vehicle driveline. The hybrid vehicle driveline may include an engine as shown in FIG. 1 that may be selectively coupled to a motor/generator to provide input to a transmission as is shown in FIG. 2. Alternatively, the engine of FIG. 1 may be included in a power split hybrid driveline with a motor and a generator as is shown in FIG. 3. A method for adjusting engine air flow and engine actuators is shown in FIGS. 4A and 4B.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to engine crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory (non-transient) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIGS. 2-3. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 and vehicle 290. Driveline 200 may be powered by engine 10. Engine 10 may be started with an engine starting system shown in FIG. 1 or via driveline integrated starter/generator (DISG) 240. Further, engine 10 may generate or adjust torque via torque actuator 204, such as a fuel injector, throttle, camshaft, valve lift, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. Voltage controller 271 may boost voltage of energy storage device 275 to operate DISG 240. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor, and the electrical energy storage device 275 may be selectively coupled to a stationary electrical power grid 299 to recharge the electrical energy storage device 275. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-N where N is an integer number between 4-25) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch(es) to the transmission case 259 and vehicle. A transmission clutch pressure may be varied (e.g., increased) to adjust the engagement state of a transmission clutch, and provide a desired amount of transmission torsion. When restart conditions are satisfied, and/or a vehicle operator wants to launch the vehicle, controller 12 may reactivate the engine by resuming cylinder combustion.

Referring now to FIG. 3, an example of an alternative driveline 300 is shown. Driveline 300 includes engine 10 and torque actuator 204 as described in FIGS. 1 and 2. Engine 10 provides torque to planetary gear set 302 and generator 304 operates in a speed control mode to control engine torque delivery to single ratio gearing system 310. Output from generator 304 provides electrical energy to energy storage device 275 and motor 306. Electrical energy storage device 275 may supply electrical power to motor 306 via variable voltage controller 271 when engine 10 is not operating. Electrical energy storage device may be a battery, capacitor, or other electrical energy storage device, and electrical energy storage device 275 may be selectively electrically coupled to stationary power grid 299. Motor 306 may also be operated in a generator mode for regenerative braking. Torque from engine 10 and motor 306 may be combined in single ratio gearing system 10 to provide torque to vehicle wheels 216 via a mechanical power path. Controller 12 controls operation of engine 10, generator 304, and motor 306 to adjust power supplied to vehicle wheels 216. Thus, the driveline of FIG. 3 does not include a transmission with multiple fixed gear ratios for delivering engine and motor power to vehicle wheels.

Thus, the system of FIGS. 1-3 provides for a vehicle system, comprising: an engine; a motor/generator in mechanical communication with the engine; and a controller including non-transitory instructions executable to rotate the engine via the motor/generator in response to a request to update a first engine air flow transfer function. The vehicle system include where the engine is rotated without combusting air and fuel at a speed greater than engine idle speed. The vehicle system further comprises additional instructions to adjust the first engine air flow transfer function based on output of a second engine air flow transfer function. The vehicle system further comprises additional instructions to adjust the first engine air flow transfer function based on an operating condition of the motor/generator. The vehicle system further comprises additional instructions for adjusting a value of a second engine air flow transfer function responsive to different operating conditions than conditions to adjust a value of the first engine air flow transfer function. The vehicle system further comprises additional instructions to rotate the engine in response to a driver removing a vehicle key or a proximity of a vehicle in which the engine operates.

Referring now to FIGS. 4A and 4B, an example method for adapting engine air flow sensor transfer functions and operating actuators based on the revised transfer functions is shown. The method of FIGS. 4A-4B may be included in the systems of FIGS. 1-3 as instructions stored in non-transitory memory.

At 402, method 400 judges if it is desired to adapt engine air flow estimates via adapting transfer functions of engine air flow sensors. In one example, method 400 may judge that it may be desirable to adapt engine air flow estimates when a vehicle has traveled a predetermined amount of miles or if the engine air-fuel ratio has deviated from a desired engine air-fuel ratio by more than a predetermined amount. If method 400 judges that it is desired to adapt engine air flow estimates via adjusting engine air flow sensor transfer functions, the answer is yes and method 400 proceeds to 404. Otherwise, the answer is no and method 400 exits.

At 404, method 400, method 400 judges whether or not it is desirable to adapt engine air flow estimate and engine air flow sensor transfer functions with an operating engine (e.g., an engine combusting air and fuel). Method 400 may judge that it is desirable to adapt engine air flow and engine air flow sensor transfer functions with an operating engine when higher engine air flow estimates are suspected to have errors. Conversely, method 400 may judge that it is desirable to adapt engine air flow and engine air flow sensor transfer functions with an engine that is not operating (e.g., not combusting air and fuel) when lower engine air flow estimates are suspected to have errors. Additionally, it may be desired to adapt engine air flow and engine air flow sensor transfer functions with a non-operating engine in response to the engine is rotating and not being fueled while the engine is operated at a low driver demand torque, such as during deceleration fuel shut-off. Further, it may be judged desirable to adapt engine air flow and engine air flow sensor transfer functions with a non-operating engine in response to a driver removing a key from an ignition or leaving the proximity of the vehicle to indicate not intent to drive the vehicle. Further still, it may be judged desirable to adapt engine air flow and engine air flow sensor transfer functions with a non-operating engine in response to the vehicle being connected or coupled to a stationary power grid. If method 400 judges that it is desired to adapt engine air flow and engine air flow sensor transfer functions with an operating engine, the answer is yes and method 400 proceeds to 406. Otherwise, the answer is no and method 400 proceeds to 450.

At 406, method 400 judges whether or not the engine and vehicle are at desired operating conditions for adapting engine air flow and engine air flow sensor transfer functions. Method 400 may judge that the engine is at desired conditions when the engine and vehicle are operating at a substantially constant speed (e.g., engine speed is 2000 RPM+ 50 RPM). In other examples, method 400 may judge that the engine and vehicle are at conditions for adapting engine air flow and engine air flow sensor transfer functions when an engine is at a warm operating temperature and operating at a substantially constant speed. Further, in some examples, method 400 may also require additional conditions be met before allowing adaption such as spark timing being at minimum spark timing for best engine torque, warm engine oil temperature, warm engine coolant temperature, stoichiometric air-fuel ratio, and no indication of engine degradation. Of course, method 400 may judge that the engine and vehicle are at conditions for adapting engine air flow and engine air flow sensor transfer functions during other operating conditions. If method judges that the engine and vehicle are at desired operating conditions, the answer is yes and method 400 proceeds to 408. Otherwise, the answer is no and method 400 returns to 402.

At 408, method 400 determines engine indicated torque based on the driveline motor. Engine indicated torque is engine brake torque plus engine friction torque. The engine friction torque may include torque to turn engine accessories as well as torque to turn the engine. In one example, engine indicated torque is determined as a function of motor torque and engine friction torque. Motor torque may be determined via a map of empirically determined motor torque values that are indexed via current supplied to the motor/generator or current output from the motor/generator and motor speed. Engine friction torque may be determined via a map of empirically determined engine friction torque values that are indexed via engine speed. The motor torque is added to the engine friction torque to determine the indicated engine torque. Method 400 proceeds to 410 after engine indicated torque is determined based on motor torque and engine friction.

At 410, method 400 determines engine indicated torque based on the engine mass air flow (MAF) sensor and engine operating conditions. In one example, engine indicated torque is determined as a function of mass air flow through engine as observed by the MAF sensor, engine speed, cam timing, and spark timing. Engine indicated torque may be determined via a map of empirically determined indicated engine torque values that are indexed via MAF sensor output, engine speed, and engine spark timing. Method 400 proceeds to 412 after engine indicated torque is determined based on the MAF sensor.

At 412, method 400 determines engine indicated torque based on engine intake manifold absolute pressure (MAP) and engine operating conditions. In one example, engine indicated torque is determined from mass air flow through the engine as observed by the MAP sensor, engine speed, air charge temperature, cam timing, and spark timing. Engine indicated torque may be determined via a map of empirically determined indicated engine torque values that are indexed via engine air flow as determined from MAP, engine speed, and engine spark timing. Engine air flow may be determined from MAP via the following equation:

$$M_e = \eta_e \frac{N_e}{2} V_d \frac{\rho}{RT}$$

where $M_e$ is mass flow rate of air through the engine, $\eta_e$ is engine volumetric efficiency, $N_e$ is engine speed, $V_d$ is engine displacement, R is a gas constant, T is intake manifold air temperature, and $\rho$ is intake manifold pressure. Method 400 proceeds to 414 after engine indicated torque is determined based on the MAP sensor.

At 414, method 400 judges whether or not select conditions are present for adjusting engine air flow and engine air flow sensor transfer functions. In one example, method 400 adjusts a MAF sensor transfer function in response if the following conditions are met:

$$\text{if } \frac{\|Tq\_ind\_mot - Tq\_ind\_map\|}{Tq\_ind\_map} < X \text{ \%; and}$$

$$\text{if } \frac{\|Tq\_ind\_MAF - Tq\_ind\_map\|}{Tq\_ind\_map} > X \text{ \%; and}$$

$$\text{if } \frac{\|Tq\_ind\_MAF - Tq\_ind\_mot\|}{Tq\_ind\_mot} > Y \text{ \%}$$

where Tq_ind_mot is indicated engine torque based on the driveline motor, Tq_ind_map is indicated engine torque based on the MAP sensor, Tq_ind_MAF is indicated engine torque based on the MAF sensor, X is a predetermined value such as a value between one and five, and Y is a predetermined value between 1 and 10. The above logic and conditions provided for updating the MAF transfer function only if the motor based indicated engine torque and MAP based indicated engine torque are within a narrow band of being equal while the MAF based indicated engine torque is not within the narrow band of being equal. For example, if motor based indicated engine torque and MAP based indicated engine torque are within two percent of being the same, and MAF based indicated engine torque is more than two percent greater than MAP based engine indicated torque and motor based engine indicated torque, then the MAF sensor transfer function is to be updated.

Similarly, the MAP sensor related transfer function and/or engine volumetric efficiency map may be updated when the following conditions are met:

$$\text{if } \frac{\|Tq\_ind\_mot - Tq\_ind\_MAF\|}{Tq\_ind\_map} < X \text{ \%; and}$$

$$\text{if } \frac{\|Tq\_ind\_MAF - Tq\_ind\_map\|}{Tq\_ind\_map} > X \text{ \%; and}$$

$$\text{if } \frac{\|Tq\_ind\_map - Tq\_ind\_mot\|}{Tq\_ind\_mot} > Y \text{ \%}$$

The above logic and conditions provided for updating the MAP transfer function only if the motor based indicated engine torque and MAF based indicated engine torque are within a narrow band of being equal while the MAP based indicated engine torque is not within the narrow band of being equal. By cross comparing engine indicated engine torque estimates from different sources, it may be possible to improve determination of transfer function values that may be deviating from a desired value. For example, if motor based indicated engine torque and MAF based indicated engine torque are within two percent of being the same, and MAP based indicated engine torque is more than two percent greater than MAF based engine indicated torque and motor based engine indicated torque, then the MAP sensor transfer function or volumetric efficiency map is to be updated. Method 400 judges if the selected conditions for adjusting engine air flow and engine air flow sensor transfer functions are present. If so, the answer is yes and method 400 proceeds to 416. Otherwise, the answer is no and method 400 proceeds to exit.

At 416, method 400 determines an engine air flow error based on engine indicated torque error. If MAF sensor transfer function adaptation conditions are met, an average corrected torque Tq_corr_MAF is determined by adding Tq_ind_map and Tq_ind_mot and dividing the result by 2. An indicated torque error Tq_ind_err_MAF is determined by subtracting Tq_ind_MAF from Tq_corr_MAF and dividing the result by Tq_ind_MAF. Since adaption is limited to the conditions described at 406, the air flow error Air_err_MAF is proportional to Tq_ind_err_MAF.

If map sensor transfer function adaptation conditions are met, an average corrected torque Tq_corr_map is determined by adding Tq_ind_MAF and Tq_ind_mot and dividing the result by 2. An indicated torque error Tq_ind_err_map is determined by subtracting Tq_ind_map from Tq_corr_map and dividing the result by Tq_ind_map. Since adaption is limited to the conditions described at 406, the air flow error Air_err_map is proportional to Tq_ind_err_map. Method 400 proceeds to 418 after the air flow error(s) is determined.

At 418, method 400 adapts at least one of the MAF sensor transfer function, the map sensor transfer function, or the engine volumetric efficiency map. If conditions are met to adapt the MAF sensor, method 400 adjusts a MAF sensor transfer function corresponding to the engine air flow rate where conditions are present for adapting the MAF sensor transfer function. In one example, the present value in the MAF sensor transfer function corresponding to the engine air flow where conditions for adjusting the MAF sensor transfer function are met is incremented by a predetermined amount in response to the Air_err_MAF value being greater than a predetermined amount. On the other hand, the present value in the MAF sensor transfer function corresponding to the engine air flow where conditions for adjusting the MAF sensor transfer function are met is decremented by a predetermined amount in response to the Air_err_MAF value being less than a predetermined amount. All entries in the MAF sensor transfer function may be updated or adapted in this way.

If conditions are met to adapt the MAP sensor related transfer function, method 400 adjusts an engine volumetric efficiency transfer function entry corresponding to the engine speed where conditions are present for adapting the MAP sensor related transfer function. In one example, the MAP sensor related transfer function value (e.g., volumetric efficiency map or table) corresponding to the engine speed and engine MAP where conditions for adjusting the MAP sensor related transfer function are met is incremented by a predetermined amount in response to the Air_err_map value being greater than a predetermined amount. On the other hand, the present value in the MAP sensor related transfer function corresponding to the engine speed and engine MAP where conditions for adjusting the MAP sensor related transfer function are met is decremented by a predetermined amount in response to the Air_err_map value being less than a predetermined amount. All entries in the MAP sensor related transfer function may be updated or adapted in this way. Method 400 proceeds to 420 after adaptive values are determined.

At 420, method 400 limits an amount of adapting of the MAF sensor transfer function and MAP sensor related transfer function that may be performed. For example, the transfer functions may be adapted by a maximum of 10% in one example. Method 400 adjusts values in the MAF sensor transfer function and/or MAP sensor related transfer function if the adjustments are within the prescribed adaptation limits. However, if the adjustments are outside of prescribed limits, the MAP and/or MAP sensor related transfer function adapted values are constrained to the prescribed limits. For example, if MAF transfer function values are allowed to adapt to +15% if an initial value and an adjustment of 20% is requested, the MAF sensor transfer function value is adjusted to only 15% greater than the initial transfer function value. Method 400 proceeds to 422 after MAF and MAP sensor related transfer functions are adapted.

At 422, method 400 adjusts engine actuators responsive to the adjusted transfer functions. In particular, method 400 may adjust spark timing, cam timing, EGR amount, and engine torque estimates based on engine air flow values that are provided via the adapted MAP and/or MAF transfer functions. For example, if the adapted MAF sensor transfer function value tends to increase estimated engine air flow, then cam timing may be retarded to reduce engine air flow, thereby providing a same amount of engine air flow at same engine operating conditions as before the time the MAF sensor transfer function was adapted. The engine spark timing values may also be adjusted by advancing spark timing toward minimum spark timing for best torque or retarding spark timing away from minimum spark timing for best torque. Method 400 proceeds to exit after engine actuators are adjusted.

At 450, method 400 judges whether or not the engine and vehicle are at desired operating conditions for adapting engine air flow and engine air flow sensor transfer functions. Method 400 may judge that the engine is at desired conditions when the engine coolant temperature is within a desired temperature range (e.g., engine coolant temperature is greater than 60° C. and less than 100° C.). Of course, method 400 may judge that the engine and vehicle are at conditions for adapting engine air flow and engine air flow sensor transfer functions during other operating conditions. If method judges that the engine and vehicle are at desired operating conditions, the answer is yes and method 400 proceeds to 452. Otherwise, the answer is no and method 400 returns to 402.

At 452, method 400 selects a speed to rotate the engine via a motor. In one example, method 400 selects a speed to rotate the engine based on a range of air flow where it is desired to adapt the MAF sensor transfer function. For example, if it is desired to adapt the MAF sensor transfer function at lower engine air flows, the engine speed is rotated at a lower speed (e.g., 600 RPM). If it is desired to adapt the MAF sensor transfer function at a higher engine air flow, method 400 may select a speed of 1500 RPM. The engine speed may be a speed where the engine has capacity to draw the desired air flow through the engine. In one example, method 400 selects speed to rotate the engine based on output of a function that describes maximum engine air flow as a function engine speed. Method 400 proceeds to 454 after the desired engine speed is selected.

At 454, method 400 begins to rotate the engine via a motor. The engine is not combusting air and fuel mixtures and fuel flow to the engine is stopped. Method 400 proceeds to 456 after the engine is rotated at the speed selected at 452.

In some examples, such as during deceleration fuel shut-off, the engine may rotate without supplying current to the motor/generator. The engine may rotate due to torque supplied to the driveline via vehicle inertia and gravitational forces. The engine speed may be varied during such conditions by shifting a transmission gear.

At 456, method 400 adjusts one or more actuators to control air flow through the engine. In one example, method 400 adjusts throttle position. Further, method 400 may adjust cam timing and valve timing to control air flow through the engine. In one example, the throttle and cam timing are adjusted based on a predetermined engine air flow that corresponds to a value stored in a table or function describing MAF sensor output or engine volumetric efficiency. Method 400 proceeds to 458 after engine actuators are adjusted to adjust air flow through the engine.

At 458, method 400 determines engine indicated torque based on the driveline motor. Engine indicated torque is engine brake torque plus engine friction torque. However, since the engine is not combusting air and fuel, the engine brake torque is negative. The negative brake torque may be correlated to air flow through the engine. Engine friction torque may include torque to turn engine accessories as well as torque to turn the engine at the present engine speed. In one example, engine indicated torque is determined as a function of motor torque and engine friction torque. Motor torque may be determined via a map of empirically determined motor torque values that are indexed via current supplied to the motor/generator or current output from the motor/generator and motor speed. Engine friction torque may be determined via a map of empirically determined engine friction torque values that are indexed via engine speed. The motor torque is added to the engine friction torque to determine the indicated engine torque. Method 400 proceeds to 460 after engine indicated torque is determined based on motor torque and engine friction.

At 460, method 400 determines engine indicated torque based on the engine mass air flow (MAF) sensor and engine operating conditions. In one example, engine indicated torque is determined as a function of mass air flow through engine as observed by the MAF sensor, cam timing, and engine speed. Engine indicated torque may be determined via a map of empirically determined indicated engine torque values that are indexed via MAF sensor output and engine speed. Method 400 proceeds to 462 after engine indicated torque is determined based on the MAF sensor.

It should be noted that spark timing and fuel type are variables that may be eliminated when the engine is rotated without spark and fuel to determine engine air flow via MAF and MAP sensors. Consequently, engine torque and air flow estimates based on MAF and MAP may be improved by not combusting air and fuel in the engine.

At 462, method 400 determines engine indicated torque based on engine intake manifold absolute pressure (MAP) and engine operating conditions. In one example, engine indicated torque is determined from mass air flow through the engine as observed by the MAP sensor, cam timing, and engine speed. Engine indicated torque may be determined via a map of empirically determined indicated engine torque values that are indexed via engine air flow as determined from MAP, engine speed, and cam timing. Engine air flow may be determined from MAP via the following equation:

$$M_e = \eta_e \frac{N_e}{2} V_d \frac{\rho}{RT}$$

where $M_e$ is mass flow rate of air through the engine, $\eta_e$ is engine volumetric efficiency, $N_e$ is engine speed, $V_d$ is engine displacement, R is a gas constant, T is intake manifold air temperature, and $\rho$ is intake manifold pressure. Method 400 proceeds to 464 after engine indicated torque is determined based on the MAP sensor.

At 464, method 400 judges whether or not select conditions are present for adjusting engine air flow and engine air flow sensor transfer functions. In one example, method 400 adjusts a MAF sensor transfer function in response if the following conditions are met:

$$\text{if } \frac{\|Tq\_ind\_mot - Tq\_ind\_map\|}{Tq\_ind\_map} < X\ \%; \text{ and}$$

$$\text{if } \frac{\|Tq\_ind\_MAF - Tq\_ind\_map\|}{Tq\_ind\_map} > X\ \%; \text{ and}$$

$$\text{if } \frac{\|Tq\_ind\_MAF - Tq\_ind\_mot\|}{Tq\_ind\_mot} > Y\ \%$$

where Tq_ind_mot is indicated engine torque based on the driveline motor, Tq_ind_map is indicated engine torque based on the MAP sensor, Tq_ind_MAF is indicated engine torque based on the MAF sensor, and X is a predetermined value such as a value between one and five. The above logic and conditions provided for updating the MAF transfer function only if the motor based indicated engine torque and MAP based indicated engine torque are within a narrow band of being equal while the MAF based indicated engine torque is not within the narrow band of being equal. For example, if motor based indicated engine torque and MAP based indicated engine torque are within two percent of being the same, and MAF based indicated engine torque is more than two percent greater than MAP based engine indicated torque and motor based engine indicated torque, then the MAF sensor transfer function is to be updated.

Similarly, the MAP sensor related transfer function and/or engine volumetric efficiency map may be updated when the following conditions are met:

$$\text{if } \frac{\|Tq\_ind\_mot - Tq\_ind\_MAF\|}{Tq\_ind\_map} < X \text{ \%; and}$$

$$\text{if } \frac{\|Tq\_ind\_MAF - Tq\_ind\_map\|}{Tq\_ind\_map} > X \text{ \%; and}$$

$$\text{if } \frac{\|Tq\_ind\_map - Tq\_ind\_mot\|}{Tq\_ind\_mot} > Y \text{ \%}$$

The above logic and conditions provided for updating the MAP transfer function only if the motor based indicated engine torque and MAF based indicated engine torque are within a narrow band of being equal while the MAP based indicated engine torque is not within the narrow band of being equal. For example, if motor based indicated engine torque and MAF based indicated engine torque are within two percent of being the same, and MAP based indicated engine torque is more than two percent greater than MAF based engine indicated torque and motor based engine indicated torque, then the MAP sensor transfer function or volumetric efficiency map is to be updated. Method 400 judges if the selected conditions for adjusting engine air flow and engine air flow sensor transfer functions are present. If so, the answer is yes and method 400 proceeds to 466. Otherwise, the answer is no and method 400 proceeds to exit.

At 466, method 400 determines an engine air flow error based on engine indicated torque error. If MAF sensor transfer function adaptation conditions are met, an average corrected torque Tq_corr_MAF is determined by adding Tq_ind_map and Tq_ind_mot and dividing the result by 2. An indicated torque error Tq_ind_err_MAF is determined by subtracting Tq_ind_MAF from Tq_corr_MAF and dividing the result by Tq_ind_MAF. Since adaption is limited to the conditions described at 450, the air flow error Air_err_MAF is proportional to Tq_ind_err_MAF.

If map sensor transfer function adaptation conditions are met, an average corrected torque Tq_corr_map is determined by adding Tq_ind_MAF and Tq_ind_mot and dividing the result by 2. An indicated torque error Tq_ind_err_map is determined by subtracting Tq_ind_map from Tq_corr_map and dividing the result by Tq_ind_map. Since adaption is limited to the conditions described at 450, the air flow error Air_err_map is proportional to Tq_ind_err_map. Method 400 proceeds to 468 after the air flow error(s) is determined.

At 468, method 400 adapts at least one of the MAF sensor transfer function, the map sensor transfer function, or the engine volumetric efficiency map. If conditions are met to adapt the MAF sensor, method 400 adjusts a MAF sensor transfer function corresponding to the engine air flow rate where conditions are present for adapting the MAF sensor transfer function. In one example, the present value in the MAF sensor transfer function corresponding to the engine air flow where conditions for adjusting the MAF sensor transfer function are met is incremented by a predetermined amount in response to the Air_err_MAF value being greater than a predetermined amount. On the other hand, the present value in the MAF sensor transfer function corresponding to the engine air flow where conditions for adjusting the MAF sensor transfer function are met is decremented by a predetermined amount in response to the Air_err_MAF value being less than a predetermined amount. All entries in the MAF sensor transfer function may be updated or adapted in this way.

If conditions are met to adapt the MAP sensor related transfer function, method 400 adjusts an engine volumetric efficiency transfer function entry corresponding to the engine speed where conditions are present for adapting the MAP sensor related transfer function. In one example, the MAP sensor related transfer function value (e.g., volumetric efficiency map or table) corresponding to the engine speed and engine MAP where conditions for adjusting the MAP sensor related transfer function are met is incremented by a predetermined amount in response to the Air_err_map value being greater than a predetermined amount. On the other hand, the present value in the MAP sensor related transfer function corresponding to the engine speed and engine MAP where conditions for adjusting the MAP sensor related transfer function are met is decremented by a predetermined amount in response to the Air_err_map value being less than a predetermined amount. All entries in the MAP sensor related transfer function may be updated or adapted in this way. Method 400 proceeds to 470 after adaptive values are determined.

At 470, method 400 limits an amount of adapting of the MAF sensor transfer function and MAP sensor related transfer function that may be performed. For example, the transfer functions may be adapted by a maximum of 10% in one example. Method 400 adjusts values in the MAF sensor transfer function and/or MAP sensor related transfer function if the adjustments are within the prescribed adaptation limits. However, if the adjustments are outside of prescribed limits, the MAP and/or MAP sensor related transfer function adapted values are constrained to the prescribed limits. For example, if MAF transfer function values are allowed to adapt to +15% if an initial value and an adjustment of 20% is requested, the MAF sensor transfer function value is adjusted to only 15% greater than the initial transfer function value. Method 400 proceeds to 472 after MAF and MAP sensor related transfer functions are adapted.

At 472, method 400 adjusts engine actuators responsive to the adjusted transfer functions. In particular, method 400 may adjust spark timing, cam timing, EGR amount, and engine torque estimates based on engine air flow values that are provided via the adapted MAP and/or MAF transfer functions. For example, if the adapted MAF sensor transfer function value tends to increase estimated engine air flow, then cam timing may be retarded to reduce engine air flow, thereby providing a same amount of engine air flow at same engine operating conditions as before the time the MAF sensor transfer function was adapted. The engine spark timing values may also be adjusted by advancing spark timing toward minimum spark timing for best torque or retarding spark timing away from minimum spark timing for best torque. Method 400 proceeds to exit after engine actuators are adjusted.

Thus, the method of FIG. 4 provides for a method, comprising: receiving vehicle information from one or more sensors to a controller; adjusting a value of a first transfer function responsive to motor operating conditions and an output of a second transfer function, the first transfer function a first basis for determining engine air flow, the second transfer function a second basis for determining engine air flow; and adjusting a torque actuator of an engine responsive to the adjusted value. The method includes where the first transfer function describes output of a mass air flow sensor. The method includes where the first transfer function describes engine volumetric efficiency. The method includes where the motor operating conditions include current output via the motor/generator. The method includes where the motor/generator operating conditions include current input to the motor/generator. The method includes where adjusting the value of the first transfer function is based on a comparison of three different engine indicated torque estimates. The method includes where the comparison includes determining a difference between a first indicted engine torque estimate and a second indicated engine torque estimate, and where the comparison includes determining a difference between the second engine indicated torque estimate and a third indicated engine torque estimate.

The method of FIG. 4 also provides for a method, comprising: receiving vehicle information from one or more sensors to a controller; adjusting a value of a first transfer function responsive to motor operating conditions and an output of a second transfer function while an engine is rotating and not combusting an air-fuel mixture, the first transfer function a first basis for determining engine air flow, the second transfer function a second basis for determining engine air flow; and adjusting a torque actuator of an engine responsive to the adjusted value. The method includes where the engine is rotating without fuel being supplied to the engine. The method includes where a motor/generator rotates the engine. The method includes where the motor/generator is rotated in response to connecting a vehicle in which the motor operates to a stationary power grid.

In some examples, the method includes where the motor is rotated in response to a driver removing a key from the vehicle or leaving a proximity of the vehicle. The method further comprises adjusting an engine air adjustment actuator while the engine is rotating and not combusting the air-fuel mixture. The method includes where the engine air adjustment actuator is a camshaft.

As will be appreciated by one of ordinary skill in the art, the methods described in FIGS. 4A and 4B may represent one or more of any number of processing strategies such as event-driven, interrupt-driven, multi-tasking, multi-threading, and the like. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method, comprising:
receiving vehicle information from one or more sensors to a controller;
adjusting a value of a first transfer function responsive to at least one of motor and generator operating conditions;
adjusting an output of a second transfer function, the first transfer function a first basis for determining engine air flow, the second transfer function a second basis for determining engine air flow; and
adjusting a torque actuator of an engine responsive to the adjusted value, where adjusting the value of the first transfer function is based on a comparison of three different engine indicated torque estimates.

2. The method of claim 1, where the first transfer function describes output of a mass air flow sensor.

3. The method of claim 1, where the first transfer function describes engine volumetric efficiency.

4. The method of claim 1, where the motor operating conditions include current output via at least one of a motor and a generator.

5. The method of claim 1, where the motor operating conditions include current input to at least one of a motor and a generator.

6. The method of claim 1, where the comparison includes determining a difference between a first indicated engine torque estimate and a second indicated engine torque estimate, and where the comparison includes determining a difference between the second indicated engine torque estimate and a third indicated engine torque estimate.

7. A method, comprising:
receiving vehicle information from one or more sensors to a controller;
adjusting a value of a first transfer function responsive to at least one of motor and generator operating conditions and an output of a second transfer function while an engine is rotating and not combusting an air-fuel mixture, the first transfer function a first basis for determining engine air flow, the second transfer function a second basis for determining engine air flow; and
adjusting a torque actuator of the engine responsive to the adjusted value.

8. The method of claim 7, where the engine is rotating without fuel being supplied to the engine.

9. The method of claim 7, where a motor rotates the engine.

10. The method of claim 9, where at least one of the motor and a generator is rotated in response to connecting a vehicle in which the motor operates to a stationary power grid.

11. The method of claim 9, where at least one of the motor and a generator is rotated in response to a driver removing a key from a vehicle or leaving a proximity of the vehicle.

12. The method of claim 7, further comprising adjusting an engine air adjustment actuator while the engine is rotating and not combusting the air-fuel mixture.

13. The method of claim 12, where the engine air adjustment actuator is a camshaft.

14. A vehicle system, comprising:
an engine;
at least one of a motor and a generator in mechanical communication with the engine; and a controller including non-transitory instructions executable to rotate the engine via the motor in response to a request to update a first engine air flow transfer function.

15. The vehicle system of claim 14, where the engine is rotated without combusting air and fuel at a speed greater than engine idle speed.

16. The vehicle system of claim 14, further comprising additional instructions to adjust the first engine air flow transfer function based on output of a second engine air flow transfer function.

17. The vehicle system of claim 16, further comprising additional instructions to adjust the first engine air flow transfer function based on an operating condition of at least one of the motor and the generator.

18. The vehicle system of claim 14, further comprising additional instructions for adjusting a value of a second engine air flow transfer function responsive to different operating conditions than conditions to adjust a value of the first engine air flow transfer function.

19. The vehicle system of claim 14, further comprising additional instructions to rotate the engine in response to a driver removing a vehicle key or a proximity of a vehicle in which the engine operates.

20. A method, comprising:
receiving vehicle information from one or more sensors to a controller;
adjusting a value of a first transfer function responsive to at least one of motor and generator operating conditions;
adjusting an output of a second transfer function, the first transfer function a first basis for determining engine air flow, the second transfer function a second basis for determining engine air flow; and
adjusting a torque actuator of an engine responsive to the adjusted value, where the first transfer function describes engine volumetric efficiency.

* * * * *